US 6,669,104 B2

(12) United States Patent
Koveal et al.

(10) Patent No.: US 6,669,104 B2
(45) Date of Patent: *Dec. 30, 2003

(54) PROCESS FOR ATOMIZING FCC FEED OIL

(75) Inventors: Russell J. Koveal, Baton Rouge, LA (US); Jackson I. Ito, Sacramento, CA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/133,141

(22) Filed: Apr. 26, 2002

(65) Prior Publication Data

US 2002/0153428 A1 Oct. 24, 2002

Related U.S. Application Data

(63) Continuation of application No. 09/526,577, filed on Mar. 16, 2000, which is a continuation-in-part of application No. 09/271,813, filed on Mar. 18, 1999, now Pat. No. 6,199,768.

(51) Int. Cl.[7] ................................................ A62C 5/02
(52) U.S. Cl. .......................... 239/8; 239/590.5; 137/896
(58) Field of Search ............................ 239/8, 11, 590.5, 239/590; 157/896, 897, 898

(56) References Cited

U.S. PATENT DOCUMENTS 2,358,386 A * 9/1944 Doll ............................ 239/402

* cited by examiner

Primary Examiner—Christopher Kim
(74) Attorney, Agent, or Firm—Erika Singleton Wilson

(57) ABSTRACT

A liquid atomization process comprises forming a two-phase fluid mixture of a liquid and a gas, under pressure, dividing the fluid into two separate streams which are passed into and through an impingement mixing zone in which they are impingement mixed to form a single stream of two-phase fluid. The mixed, single stream is then passed into and through a shear mixing zone and then into a lower pressure expansion zone, in which atomization occurs to form a spray of atomized drops of the liquid. The impingement and shear mixing zones comprise respective upstream and downstream portions of a single fluid passageway in a nozzle. This is useful for atomizing the hot feed oil in an FCC process.

4 Claims, 8 Drawing Sheets

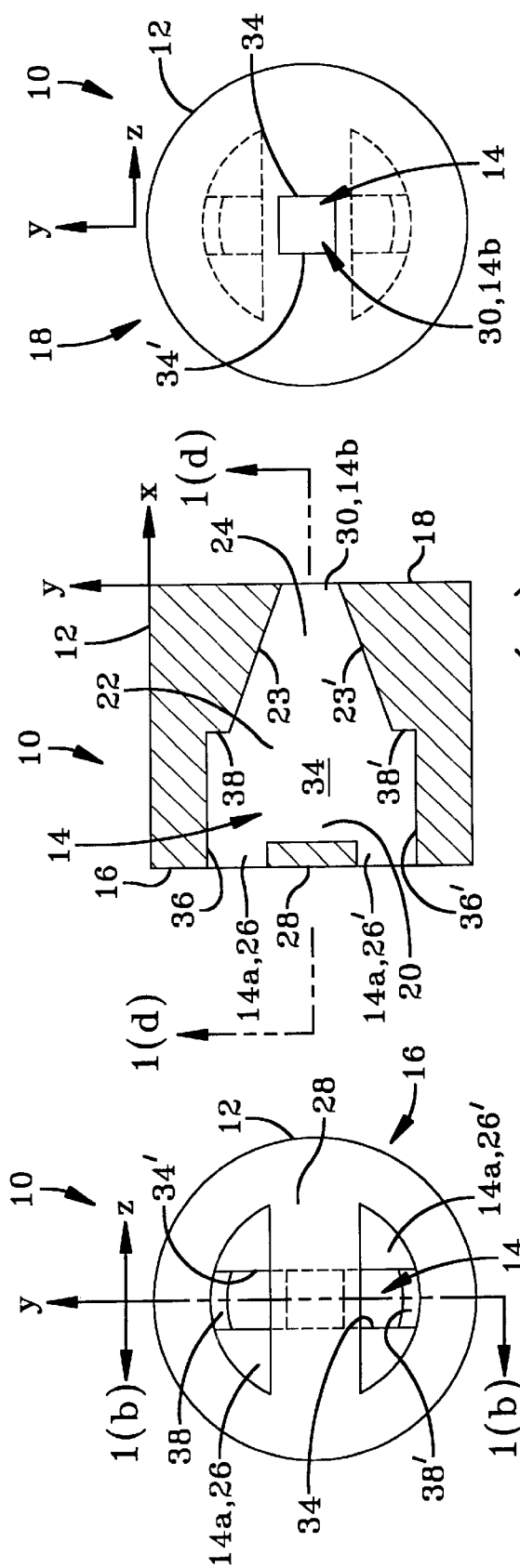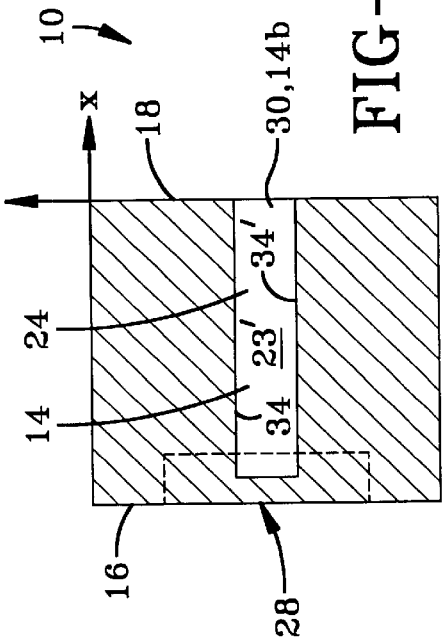

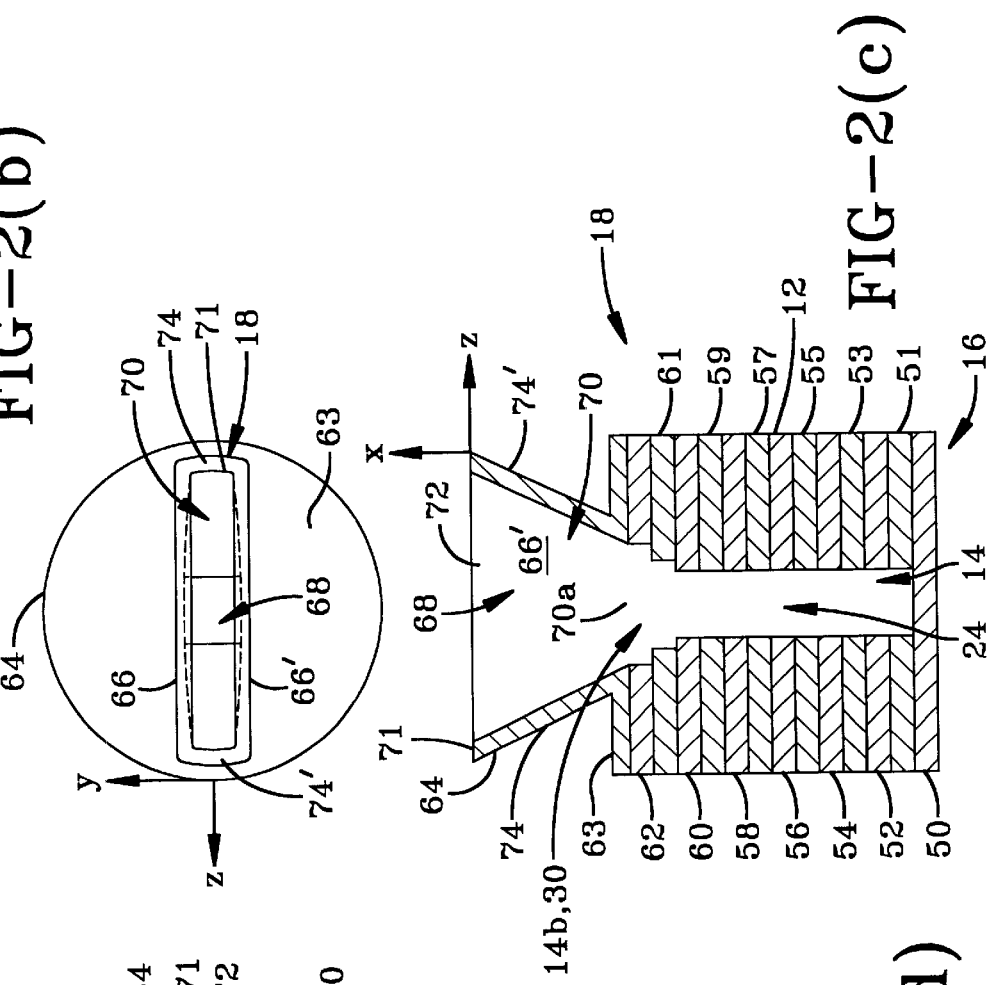

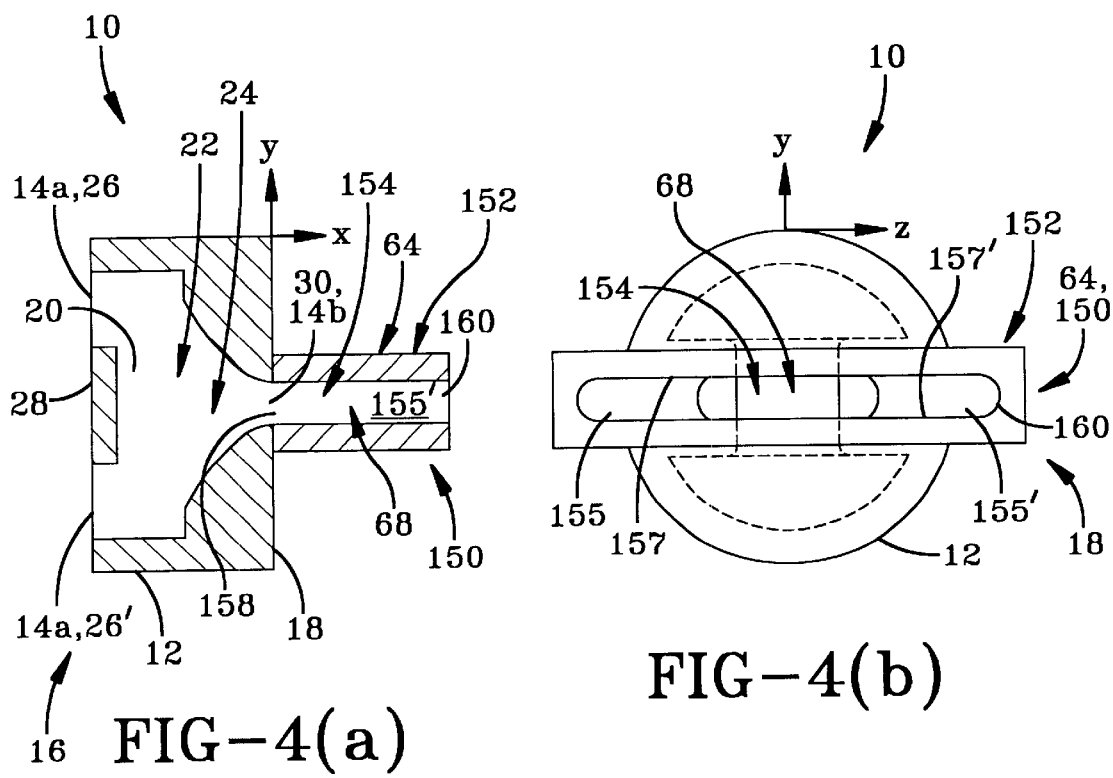
FIG-4(a)
FIG-4(b)
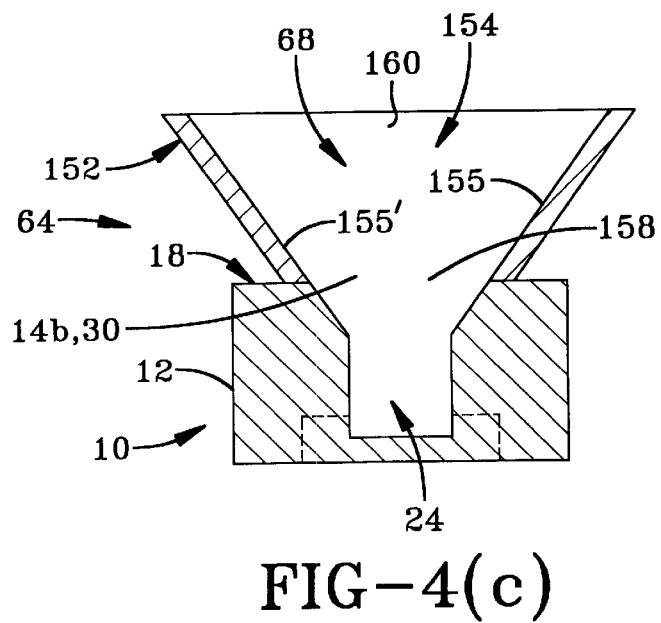
FIG-4(c)

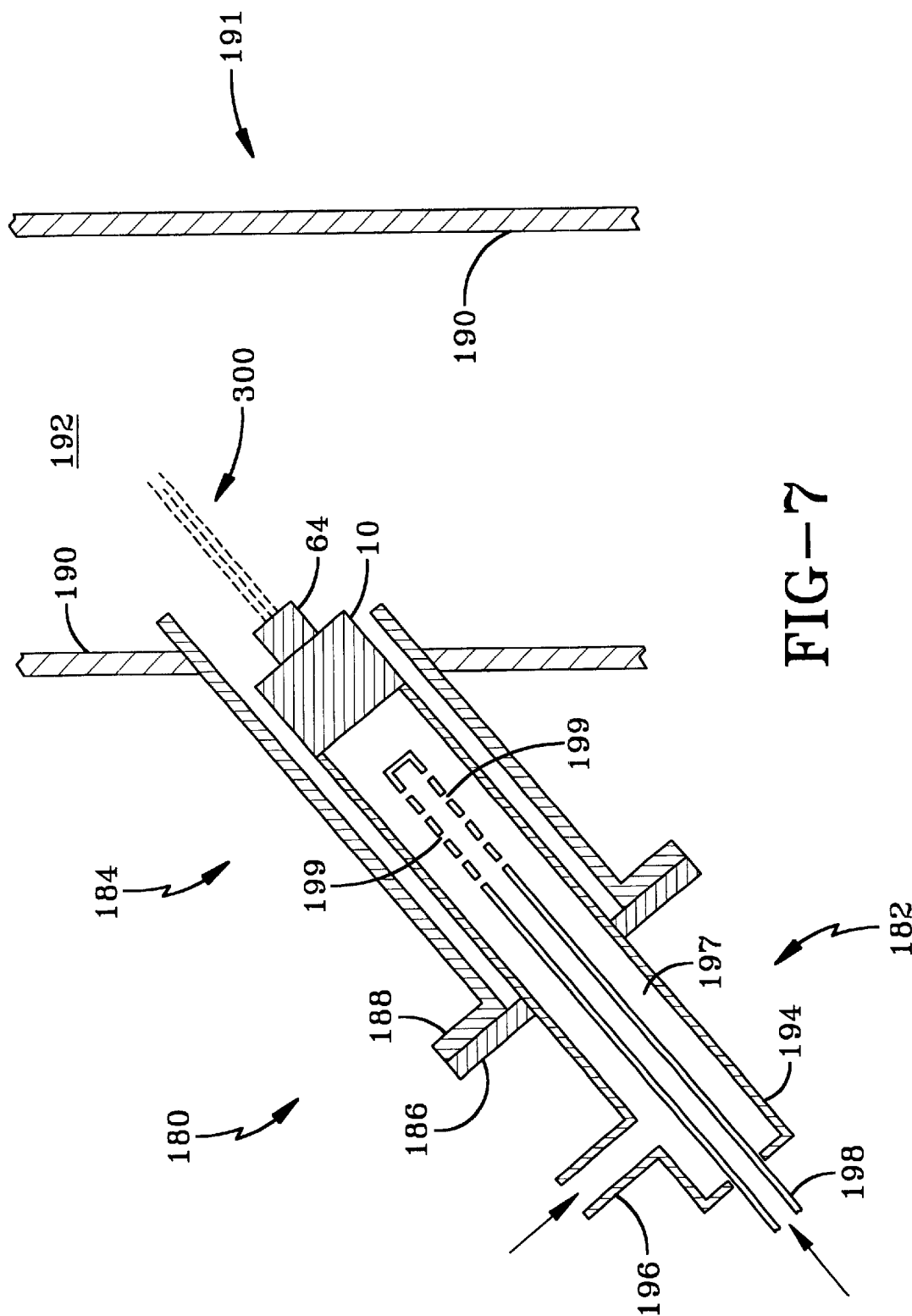

PROCESS FOR ATOMIZING FCC FEED OIL

CROSS-REFERENCE TO RELATED APPLICATIONS

This application is a continuation of U.S. patent application Ser. No. 09/526,577 filed Mar. 16, 2000, which is a continuation-in-part of U.S. patent application Ser. No. 09/271,813 filed Mar. 18, 1999 now U.S. Pat. No. 6,199,768.

FIELD OF THE INVENTION

The invention relates to a liquid atomizing process and apparatuses, namely apparatuses and processes used in conjunction with fluid catalytic cracking (FCC) processes that require high fluid throughput and low pressure drop. The process comprises forming a two-phase fluid mixture of the hot feed oil and a dispersion gas, such as steam, dividing the fluid mixture into two separate streams which are passed under pressure through an impingement mixing zone, a shear mixing zone to recombine the streams into a single stream which passes into a lower pressure atomization zone, where atomization occurs to form a spray of atomized liquid droplets.

BACKGROUND OF THE INVENTION

Fluid atomization is well known and used in a wide variety of applications and processes, including aerosol sprays, the application of pesticides and coatings, spray drying, humidification, mixing, air conditioning, and chemical and petroleum refinery processes. In many applications, a pressurized fluid (with or without the presence of an atomizing agent) is forced through an atomization nozzle having a relatively small orifice. Atomization occurs at the downstream side of the orifice, and the degree of atomization is determined by the orifice size, the pressure drop across the orifice, fluid density, viscosity, and surface tension. Atomization is increased and the droplet size is decreased with decreasing orifice size and increasing pressure drop.

Increasing the degree of atomization of relatively viscous fluids at high flow rates is particularly challenging, especially for the heavy petroleum oil feeds that may be used in FCC processes. FCC processes are widely used in the petroleum refining industry primarily for converting high-boiling petroleum oils to more valuable lower-boiling products including gasoline and middle distillates such as kerosene, jet and diesel fuel, and heating oil.

In FCC processes, a preheated feed is often mixed with an atomization promoting fluid, such as steam, to assist in the atomization of the feed. The atomized feed contacts a particulate, hot cracking catalyst flowing up through a riser which comprises the FCC reaction zone. Smaller oil feed droplet sizes in the reaction zone result in more feed conversion to valuable products, particularly with the incorporation of heavy feed material, such as a resid, into the FCC feed. In some instances, feed material that does not contact the uprising catalyst particles thermally cracks primarily to methane and coke—generally undesirable products. Consequently, efforts continue to try to find economically viable means to decrease the droplet size of the atomized oil, preferably without an unacceptably high pressure drop through the atomizer or nozzle and/or without increasing the amount of steam or other atomization promoting agent. Examples of such efforts are disclosed in U.S. Pat. Nos. 5,289,976 and 5,173,175, which disclose an average feed droplet size in the range of about 400–1000 microns. There is still a need for finer atomization of the heavy oil feed for the FCC process and of other fluids for other processes as well. It would be particularly beneficial if the atomized liquid droplet size could be reduced to less than 300 microns.

SUMMARY OF THE INVENTION

One embodiment of the present invention comprises a liquid atomization apparatus comprising a body comprising a fluid inlet and a fluid outlet and configured to define an impingement mixing zone and a shear mixing zone. The zones are positioned between the inlet and the outlet. The fluid inlet comprises a splitter that can split an incoming fluid stream into at least two streams. The impingement mixing zone comprises at least one impingement surface configured to impinge at least a portion of one fluid stream against another impinged stream wherein the included angle between two impinged streams is between about 120° and 240°. The shear mixing zone has a cross-sectional area defined by a first dimension and a second dimension, wherein the first dimension decreases along a longitudinal axis through the body in a direction toward the fluid outlet.

Another embodiment of the present invention comprises a liquid atomization apparatus comprising a body comprising at least one fluid inlet, at least one fluid outlet, and a fluid passageway extending between the inlet and the outlet. The passageway defines an impingement mixing and a shear mixing zone downstream from the impingement mixing zone. The passageway also defines at least one impingement surface configured to be substantially perpendicular to a longitudinal axis extending through the body. The impingement surface is configured to impart radially inward flow (in a direction normal to the overall flow direction) to a portion of fluid flowing through the passageway. The shear mixing zone has a cross-sectional area defined by a first dimension and a second dimension, wherein the first dimension decreases along a longitudinal axis through the body in a direction toward the fluid outlet.

Another embodiment of the present invention comprises a process for forming a spray of liquid droplets comprising the steps of: (a) forming at least two streams of a two-phase fluid comprising a gas phase and a liquid phase; (b) passing the streams to an impingement mixing zone wherein at least a portion of each stream is impinged against at least a portion of another stream and wherein the included angle between the impinged streams is between about 170° and 190° to form a single mixed stream; (c) passing the single mixed stream to a shear mixing zone and imparting shear mixing forces to the single mixed stream to form a shear mixed stream; and, (d) passing the shear mixed stream to an atomizing zone wherein the gas phase expands and increases the surface area of the liquid phase, thereby producing a spray of liquid droplets.

Another embodiment of the present invention comprises a process for forming a spray of liquid droplets comprising the steps of: (a) forming a plurality of streams of a two-phase fluid comprising a gas phase and a liquid phase; (b) impinging at least a portion of each stream against at least a portion of another stream to form a single mixed stream, wherein the included angle between the impinged streams is between about 120° and 240°; (c) subjecting the single mixed stream to shear mixing forces, thereby forming a shear mixed stream; and, (d) expanding the gas phase in the shear mixed stream, thereby producing a spray of liquid feed droplets.

Another embodiment of the present invention comprises a catalytic cracking process comprising the steps of: (a)

forming at least two streams of a two-phase fluid comprising a gas phase and a liquid phase, the liquid phase comprising a FCC feed; (b) passing the streams to an impingement mixing zone wherein at least a portion of each stream is impinged against at least a portion of another stream and wherein the included angle between the impinged streams is between about 120° and 240°, thereby forming a single mixed stream; (c) passing the single mixed stream to a shear mixing zone and imparting shear mixing forces to the single mixed stream to form a shear mixed stream; (d) passing the shear mixed stream to an atomizing zone wherein the gas phase expands and increases the surface area of the liquid phase, thereby producing a spray of liquid feed droplets; (e) passing the spray of liquid feed droplets into a FCC reaction zone; and, (f) contacting the liquid feed droplets with a catalytic cracking catalyst under catalytic cracking conditions. In one embodiment the impingement zone and the shear mixing zone are contained within an embodiment of a nozzle described herein.

Another embodiment of the present invention comprises a catalytic cracking process comprising the steps of: (a) forming a plurality of streams of a two-phase fluid comprising a gas phase and a liquid phase, the liquid phase comprising a FCC feed; (b) impinging at least a portion of each stream against at least a portion of another stream to form a single mixed stream, wherein the included angle between the impinged streams is between about 170° and 190°; (c) subjecting the single mixed stream to shear mixing forces, thereby forming a shear mixed stream; (d) expanding the gas phase in the shear mixed stream, thereby producing a spray of liquid feed droplets; and, (e) contacting the liquid feed droplets with a catalytic cracking catalyst under catalytic cracking conditions.

In each process and/or apparatus of the present invention, the included angle between the impinged streams is more preferably between about 175° and about 180°, most preferably about 180°.

BRIEF DESCRIPTION OF THE DRAWINGS

FIG. 1(a) illustrates an axially downstream view of one embodiment of a nozzle viewed looking into the fluid inlet of the nozzle. FIG. 1(b) illustrates a cross-sectional side view of the embodiment shown in FIG. 1(a) taken along the 1(b)—1(b) axis. FIG. 1(c) illustrates an axially upstream view of the embodiment shown in FIG. 1(a) looking into the fluid outlet of the nozzle. FIG. 1(d) illustrates a top cross-sectional view of the embodiment shown in FIG. 1(a) taken along the 1(d)—1(d) axis shown in FIG. 1(b).

FIG. 2(a) illustrates a cross-sectional side view of another embodiment of the nozzle. FIG. 2(b) illustrates an axially upstream view of the embodiment shown in FIG. 2(a) looking into the fluid outlet of the nozzle. FIG. 2(c) illustrates a top cross-sectional view of the embodiment shown in FIG. 2(a) and incorporates one embodiment of a spray distributor. FIG. 2(d) is an embodiment of the platelets that may be used to construct the embodiment shown in FIG. 2(a). For clarity, the platelet lines within the fluid passageway are not shown in FIGS. 2(a) and 2(c).

FIG. 4(a) illustrates a cross-sectional side view of another embodiment of the nozzle. FIG. 4(b) illustrates an axially upstream view of the embodiment shown in FIG. 4(a) looking into the fluid outlet of the nozzle. FIG. 4(c) illustrates a top cross-sectional view of the embodiment shown in FIG. 4(a) and incorporates another embodiment of a spray distributor.

FIG. 7 illustrates a cross-sectional view of a FCC feed injection unit employing an embodiment of a nozzle.

DETAILED DESCRIPTION

Figure 3D:
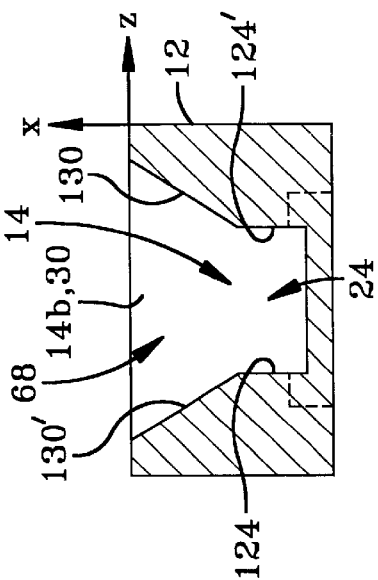
FIG. 3(d) illustrates a top cross-sectional view of the embodiment shown in FIG. 3(a) taken along the 3(d)—3(d) axis shown in FIG. 3(c).

As used herein, the cross-sectional area of an area or zone through which a fluid flows shall be that area normal to the x-axis shown in the Figures and that area defined by dimensions in the y- and z-axes. As used herein, "along" an axis shall mean along that axis or substantially parallel to that axis as shown in the Figures. As used herein, the longitudinal axis of the nozzle body or fluid passageway is along the x-axis, or axis of overall fluid flow through the nozzle.

The two-phase fluid fed into nozzle 10 may be gas-continuous or liquid-continuous, or it may be a bubbly froth, where it is not known with certainty if one or both phases are continuous. This may be further understood with reference to an open-cell sponge and a closed-cell sponge. Sponges typically have a 1:1 volumetric ratio of air to solid. An open-cell sponge is both gas (air) and solid continuous, while a closed-cell sponge is solid continuous and contains discrete (dispersed) gas cells. In an open-cell sponge, the solid comprises membranes and ligaments (such as may exist in a two-phase gas-liquid froth or foam). In a closed-cell sponge, the gas may comprise a dispersion of discrete gas globules in the solid. Some sponges fall in between the two, as do some two-phase fluids comprising a gas phase and a liquid phase.

It is not possible to have a sponge that is gas-continuous and not also solid-continuous, but it is possible to have a two-phase gas and liquid fluid that is gas-continuous only. Therefore, the particular morphology of the fluid as it passes into and through the mixing nozzle of the invention, is not always known with certainty. There must be sufficient gas present in the fluid entering the nozzle for the impact and shear mixing to increase the surface area of the liquid phase. This is reflected in reducing (i) the thickness of any liquid membrane, (ii) the thickness and/or length of any liquid rivulets, and (iii) the size of any liquid globules in the fluid, either before or during the atomization. In practice, the impingement and shear mixing in nozzle 10 and through the one or more orifices will only occur with a two-phase fluid comprising a gas phase and a liquid phase.

Preferably, the fluid comprises mostly gas on a volumetric basis (e.g., a volumetric gas to liquid ratio of at least 2:1) for efficient shear mixing. A single-phase fluid (e.g., liquid) passed through nozzle 10 will have its kinetic energy increased directly proportional to the pressure drop across the nozzle 10. With a two-phase fluid, the gas velocity is increased relative to the velocity of the liquid phase, (i) in the impingement mixing zone 22, (ii) in the shear mixing zone 24, and (iii) when the fluid passes through an orifice of smaller cross-sectional area than the fluid conduit upstream of fluid inlet 14a (a pressure-reducing orifice).

The velocity difference between the gas and liquid phases results in ligamentation of the liquid, particularly with a viscous liquid such as a hot FCC feed oil. Ligamentation means that the liquid forms elongated globules or rivulets. The velocity difference is decreased during shear mixing. Thus, passing a two-phase fluid through a pressure-reducing orifice or mixing it in impingement mixing zone 22 produces a velocity differential between the gas and liquid which results in ligamentation of the liquid and/or dispersion of the liquid in the gas due to shearing of the liquid into elongated ligaments and/or dispersed drops. Additional shear of the liquid occurs when the fluid enters the fluid inlet 14a (openings 26, 26') of nozzle 10 and through one or more atomizing orifice(s) positioned within the fluid passageway 14. The additional shear also adds to reduction of the ultimate liquid droplet size in the atomized spray. Preferably, the cross-sectional area of the nozzle outlet 14b (orifice 30) is smaller than the sum of the cross-sectional areas of fluid openings 26, 26'.

Nozzle 10 may also comprise an atomization zone 68 at a lower pressure than the pressure upstream of the atomizing orifice. Zone 68 may be configured within nozzle 10 or may be configured as part of a spray distributor 64 attached to nozzle 10. Consequently, the gas in the fluid passing through the atomizing orifice rapidly expands, thereby dispersing the liquid rivulets and/or droplets into the atomization zone 68. The rivulets break into two or more droplets during the atomization. The atomizing zone may be a discrete, readily discernable orifice downstream from shear mixing zone 24, or it may comprise a zone 68 of the smallest cross-sectional area in shear mixing zone 24 as illustrated in FIG. 6(b). In the later case, fluid atomization begins in shear mixing zone 24.

In the strictest technical sense, atomization may refer to increasing the surface area of a liquid when the steam or other atomizing gas is mixed with, or injected into, the liquid to be atomized. In the context of the invention, atomization means that as the fluid passes through the atomizing orifice, the liquid phase breaks up, or begins to break up, into discrete masses in the gas phase and this continues as the fluid continues downstream and the liquid is atomized into a spray of droplets dispersed in the gas phase.

The present invention comprises both a process and an apparatus for atomizing a liquid, wherein the liquid experiences both impingement and shear mixing. The impingement mixing and shear mixing both occur in a fluid passageway 14 longitudinally extending through the interior of a hollow nozzle 10 that defines an at least one expansion zone 20, an impingement mixing zone 22, and a shear mixing zone 24. The fluid passageway 14 is open at both ends (fluid inlet 14a, fluid outlet 14b). Fluid inlet 14a is at the nozzle upstream end 16, and fluid outlet 14b is at the nozzle downstream end 18.

In a process embodiment of the present invention, at least two separate streams of a two-phase fluid comprising a gas and the liquid to be atomized are simultaneously and sequentially passed, under pressure, through impingement mixing zone 22 and shear mixing zone 24. In the impingement mixing zone 22, the separate streams are mixed to form a single mixed stream by colliding or impinging at least a portion of each stream against the other.

In the impingement mixing zone 22, the separate streams mix mostly (>50%) by impingement. Shear mixing means that mixing occurs mostly by shear forces. Impingement mixing between two fluid streams occurs when the half angle between the streams ranges between at least 15° up to 90°, and the total included angle between the impinging streams ranges from about 30° to about 180°, with 180° producing the most violent and chaotic mixing. Shear mixing occurs when the half angle ranges from about 0° to about 15°.

In the practice, at least a portion (e.g., ≧20%) of each fluid stream in the impingement mixing zone 22 also has a flow component parallel to the downstream flow direction, so that not all mixing in zone 22 occurs by impingement. In a preferred embodiment, at least the laterally outer or peripheral portion of each fluid stream is directed against the other in the impingement mixing zone 22, preferably at an angle of 90°±30° normal to the longitudinal flow direction of the fluid (direction of ordinary or overall fluid flow), more preferably 90±10°, more preferably 90°±5°, more preferably 90°±2°, most preferably about 90° (or substantially parallel to the y-axis shown in the Figures). Fluid expansion in the impingement mixing zone 22 and shear mixing zone 24 is minimized.

The impingement mixing zone 22, the shear mixing zone 24, and the atomization zone 68 are all in fluid communication. After impingement, the mixed stream passes through shear mixing zone 24 where further mixing of the mixed stream occurs. The impingement and shear mixing zones 22, 24 may comprise respective upstream and downstream portions of fluid passageway 14. The downstream end of impingement mixing zone 22 fluidly communicates with the upstream end of the shear mixing zone at the impingement mixing zone-shear mixing zone interface. The kinetic energy imparted to the fluid by the impingement and shear mixing forms a single stream that, when atomized, produces small liquid droplets dispersed in a gas continuous phase. The average size of the liquid drops or droplets dispersed in the gas phase after passing through the nozzle is smaller (e.g., at least 10% smaller and preferably at least 50% smaller) than upstream of the nozzle.

Shear mixing zone 24 fluidly communicates with an atomizer or atomization zone 68 in a spray distributor 64, or as discussed herein, atomization zone 68 may be configured as part of shear mixing zone 24.

The atomizer may comprise an orifice having a smaller cross-sectional area than the smallest cross-sectional area in the shear mixing zone 24, resulting in a pressure drop across the atomizer and further shear of the two-phase fluid as it enters the lower-pressure atomization zone 68. For example, in FIG. 4(a), the atomizer may comprise distributor inlet 158 or nozzle orifice 30. This shear further reduces the liquid droplet size. As the fluid passes into atomization zone 68, it rapidly expands and produces a spray of atomized liquid droplets. This rapid expansion and production of a spray of liquid droplets comprises atomization.

The fluid outlet of shear mixing zone 24 fluidly communicates with a spray distributor 64 that shapes the spray into a desired shape. Spray distributor 64 may comprise part of the atomization zone 68 and may or may not comprise part of nozzle 10. Spray distributor 64 is preferably used to minimize coalescence of the liquid phase prior to atomization. In another embodiment, shear mixing zone 24 may fluidly communicate with an atomizer that comprises includes a hollow fluid conduit open at both ends and an atomizing orifice and a spray distributor at its downstream end. In this embodiment, the cross-sectional area of the conduit perpendicular to the direction of fluid flow is preferably greater than the smallest cross-sectional area of shear mixing zone 24 and the atomizing orifice. This minimizes agglomeration or coalescence of the liquid phase as the fluid flows through the atomizer.

This process and apparatus are useful for atomizing a large volume of hot feed oil into the riser reaction zone of a FCC unit to achieve a relatively small feed droplet size and uniform droplet size distribution of the atomized feed droplets with a minimal pressure drop across the mixing zones 22, 24 and atomizer. For example, with a 4-inch diameter nozzle, it is possible to atomize 30 pounds per second of the hot oil feed, at a pressure drop across the nozzle of less than 50, and preferably less than 40 pounds per square inch (psi). When used to atomize a FCC feed oil, nozzle 10 will comprise part of a feed injector 182 (see FIG. 7) that house nozzle 10 as is discussed later. Typically a plurality of feed injectors 182 are employed, preferably positioned circumferentially around the upstream end of the FCC reaction zone that is proximate to the bottom of the riser. The hot feed oil is usually mixed with steam (and/or other dispersion/atomizing gas) upstream of nozzle 10 to form a two-phase fluid comprising a steam phase and a hot, FCC feed oil liquid phase. This mixing also increases the velocity of the flowing two-phase fluid. Mixing of the steam and oil upstream of nozzle 10 is typically achieved in feed injector 182, by steam or other dispersion gas sparging means, as is known.

The two-phase fluid stream is split or divided into two separate streams, preferably using a splitter 28. In one embodiment, such as that shown in FIG. 5, both streams flow simultaneously over splitter 28 and through two separate fluid openings 26, 26'. Splitter 28 may be suitably positioned at fluid inlet 14a so that splitter 28 and fluid passageway 14 define the at least two fluid openings 26, 26'. Fluid openings 26, 26' are preferably symmetrically identical, and they are equidistantly and laterally spaced from the longitudinal axis (the x-axis in the Figures) of fluid passageway 14.

In the impingement mixing zone 22, a flow component is imparted to each stream and is directed radially inward and preferably perpendicular to the longitudinal axis of fluid passageway 14 (i.e., along or substantially parallel to the y-axis shown in the Figures). The flow component is directed toward at least a portion of the other stream that has a corresponding flow component directed radially inward. At least a portion of each stream impinges against the other, resulting in turbulent impingement mixing and a concomitant reduction in the liquid droplet size. The resulting mixed fluid stream then passes into shear mixing zone 24 for further mixing with less pressure drop than occurs in impingement mixing zone 22. The mixed stream then passes into the lower-pressure atomization zone 68.

The cross-sectional area of the atomizing orifice normal to the fluid flow direction is typically smaller than the cross-sectional area of the fluid conduit(s) 164 (see FIG. 5) feeding the fluid to nozzle 10. This results in a velocity increase of the fluid flowing through the orifice 30 and into the lower-pressure atomization zone 68. Preferably, the cross-sectional area of orifice 30 is also smaller than the sum of the cross-sectional areas of fluid openings 26, 26'. This velocity increase produces additional shearing of the two-phase fluid that, in conjunction with the rapid expansion of the gas phase, produces a further reduction in the size of the liquid droplets.

Spray distributor 64 may be expanding and fan-shaped, having an interior that comprises fan-shaped fluid passageway 154 open at its upstream and downstream ends. Spray distributor 64 is preferably positioned adjacent the downstream side of the atomizing orifice for controlling the shape of the atomized spray. Spray distributor 64 may or may not be configured as part of nozzle 10, but is preferably attached to nozzle 10 by any conventional means, including pinned connections. Another embodiment of spray distributor 64 is described in reference to FIGS. 2(a)–2(d).

The apparatus of the present invention comprises a nozzle having a single fluid passageway 14 having a longitudinal axis (x-axis) extending through the nozzle, with at least two fluid openings 26, 26' at the fluid inlet 14a at upstream end 16 and at least one fluid outlet 14b that may terminate in an orifice at downstream end 18. The inlet 14a and outlet 14b are longitudinally spaced apart along the longitudinal axis. The cross-sectional area of the impingement mixing zone 22 portion of fluid passageway 14 is smaller at its downstream end then its upstream end. At least a portion of the cross-sectional area of the shear mixing zone 24 portion of fluid passageway 14 decreases or converges in the direction of fluid outlet 14b. In one embodiment, fluid passageway 14 is formed by at least two pairs of spaced-apart and opposing side walls, with each wall of each pair being equidistantly spaced apart from the longitudinal axis. The area between the sidewalls defines fluid passageway 14, which may have an overall rectangular cross-section.

The cross-sectional area of an area of fluid passageway 14 may be varied by varying the distance between at least a portion of at least one pair of opposing walls in either a first dimension along the y-axis or a second dimension along the z-axis. In some embodiments, the cross-sectional area of shear mixing zone 24 decreases or converges in the direction of fluid outlet 14b. In other embodiments, the cross-sectional area of shear mixing zone 24 decreases part of the way toward fluid outlet 14b and may increase as zone 24 progress toward outlet 14b. The cross-sectional area may be varied in either direction (first or second dimensions(s)), i.e. along the z-axis or along the y-axis. The cross-sectional area of fluid passageway 14 is greatest at the upstream end of the impingement mixing zone 22, near fluid openings 26, 26'. In other embodiments, the cross-sectional area of shear mixing zone 24 will not vary because the distance along the y-axis will decrease at the same rate as the distance along the z-axis increases.

FIGS. 1(a)–1(d) illustrate one embodiment of nozzle 10. Nozzle 10 comprises a body 12, the interior of which comprises a single, unitary and generally longitudinal fluid passageway 14 having a fluid inlet 14a (openings 26, 26') and a fluid outlet 14b. Fluid passageway 14 has a longitudinal axis (x-axis) coincident with the longitudinal axis (x-axis) of nozzle 10. The upstream end and downstream end of fluid passageway 14 are located at the respective upstream end 16 and downstream end 18 of nozzle 10.

Viewing FIG. 1(b), fluid passageway 14 has a rectangular cross-section and is divided into three sequential zones (expansion zone 20, impingement mixing zone 22, and shear mixing zone 24), all of which are in fluid communication, with adjacent zones in direct fluid communication.

Referring to FIG. 1(a), fluid inlet 14a comprises a pair of symmetrically identical and circle segment-shaped fluid openings 26, 26' separated by a splitter 28. Splitter 28 comprises a generally rectangular-shaped plate that bisects fluid inlet 14a to split a stream of flowing two-phase fluid into two separate streams that flow through fluid openings 26, 26'. The edges of splitter 28 form the chordal portion of each respective fluid entrance 26, 26'.

The downstream end of the fluid passageway 14 comprises a non-circular exit orifice 30. In this embodiment, orifice 30 is square-shaped, although other shapes may also be employed, but a non-circular orifice 30 is preferred. Orifice 30 may or may not comprise at least a portion of the atomizer or atomizing zone 68. The non-circular shape of orifice 34 also produces a more uniform size distribution of the atomized oil droplets than a circular or arcuate orifice would.

Referring to FIGS. 1(b)–1(d), fluid passageway 14 is formed by two different pairs of opposing walls (36-38-23)-(36'-38'-23') and 34-34', as shown. Walls 34 and 34' are identical, flat, parallel and are rectangular in shape, while 36-38-23 and 36'-38'-23' are symmetrical. The same point on a wall pair is equidistant from the longitudinal axis for each wall, with the intersection of walls (36-38-23)-34 and (36'-38'-23')-34' each forming a right angle, although in some embodiments, the intersection points are arced or full radiused. Walls 36-38-23 and 36'-38'-23' each begin upstream with an arcuate or circular shape perpendicular to the longitudinal axis of nozzle 10, substantially conforming to the circular or arced shape of feed conduit 164 (see FIG. 5) and fluid openings 26, 26'. The shape of fluid passageway 14 is maintained along fluid passageway 14 until steps 38–38' (also referred to herein as the impingement mixing surfaces) at the entrance to shear mixing zone 24. In shear mixing zone 24, the shape of fluid passageway 14 may change to a generally flat, four-sided shape that continues to orifice 30, to more effectively utilize the impingement mixing momentum.

Figure 5:
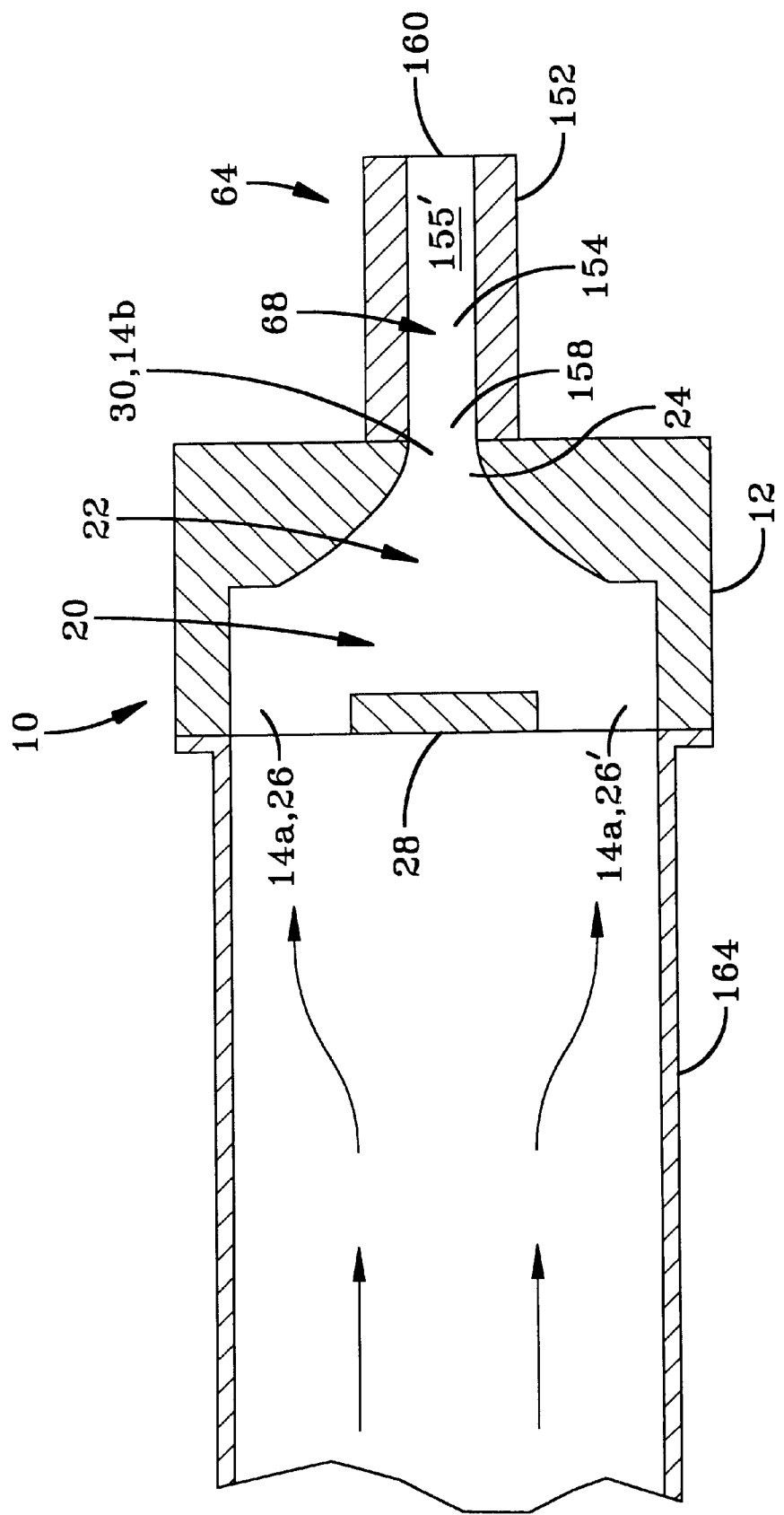
FIG. 5 is a cross-sectional view of a nozzle (and spray distributor) in fluid communication with a fluid conduit that feeds the nozzle.

Fluid openings 26, 26' are diametrically opposite and radially and equidistantly spaced apart from the longitudinal axis. The combined cross-sectional areas of openings 26, 26' is smaller than the cross-sectional area of expansion zone 20, but larger than the cross-sectional area just downstream of steps 38, 38' to reduce the pressure drop of the fluid entering shear mixing zone 24. Fluid openings 26, 26' are velocity-increasing openings because their cross-sectional area is smaller than the cross-sectional area of the fluid conduit 164 as shown in FIG. 5.

Referring to FIG. 1(b), a two-phase fluid stream splits into two equal streams over splitter 28 and enters fluid passageway through openings 26, 26'. The pressure drop across splitter 28 may be too high for some applications and, hence, a lower pressure drop means for introducing fluid into the nozzle can be employed. Flow through openings 26, 26' into expansion zone 20 imparts shearing forces because the lighter gas phase accelerates more quickly than the heavier liquid phase. Expansion zone 20 is a controlled expansion zone 20 in the sense that the fluid is not permitted to freely expand, as it is atomization zone 68. The expansion zone 20 reduces the pressure drop from what it would otherwise be if it were not present.

At least the outer peripheral portion of both streams impacts or impinges directly onto the right-angle steps (impingement surfaces) 38-38' and is forced radially inward to impinge directly into another impinged stream in impingement mixing zone 22. In an embodiment having right-angled impingement surfaces or steps 38–38', the included angle between the impinging fluids is 180°. Thus, the impingement surfaces are formed in the y-z plane normal to the x-axis. The impingement directs the radially inward component of both streams to substantially along the longitudinal axis of fluid passageway 14 to produce maximum impingement mixing.

As the fluid continues downstream, it enters shear mixing zone 24 where the cross-sectional area decreases in the downstream direction to increase the flow velocity and further reduce the size of the liquid droplets, primarily with shearing forces. While there is no abrupt change from impingement mixing zone 22 to shear mixing zone 24, shear mixing substantially begins downstream of steps 38–38'. One pair of opposing walls 23, 23' defining shear mixing zone 24 are sloped and converge inward toward orifice 30. The gradual decrease in the cross-sectional area of shear mixing zone 24 increases the fluid velocity, and the maximum fluid velocity occurs preferably at orifice 30.

In another embodiment not shown, two separate fluid streams from any convenient source that comprise a two-phase mixture of a gas and a liquid pass into fluid passageway 14 through fluid openings 26, 26'. In this embodiment, the two separate feed lines must be sized to achieve the desired fluid inlet velocity.

FIG. 2(a) illustrates another embodiment of nozzle 10, fabricated of a plurality of stacked metal platelets, 50–62. For clarity, the intersection lines of platelets 50–62 within passageway 14 are not shown. The individual metal platelets are prepared having the required passages therein, as holes, slots, or orifices extending through the platelet. They are then stacked together, bolted and/or diffusion bonded together, to form nozzle 10. Starting from upstream end 16, platelet 50 comprises a disk having two circle segment-shaped openings 26, 26' defined by stream splitter 28 similar to that shown in FIG. 1(b). FIG. 2(d) illustrates platelet 56. Platelet 56 comprises two shoulders 80, 80' on opposite sides of orifice 15. Shoulders 80, 80' and orifice 15 are sized and configured to appropriately define impingement surfaces (steps) 38, 38'. Progressing downstream, the sizes of orifices 15 in each subsequent platelet decreases as shown similar to the convergence of shear mixing zone 24 shown in FIG. 1(b). While each of the radially inward steps of each successive disk 57-62 is not large enough to impart as much radially inward momentum to the flowing fluid as shoulders 80, 80', they impart a radially inward mixing component to the flowing fluid. The orifices 15 of the platelet that define shear mixing zone 24 have varying first dimensions, wherein the first dimension of the orifice 15 of each platelet defining shear mixing zone 24 is smaller than the first dimension of the orifice 15 of the platelet preceding it. Preferably, the orifices 15 of at least one platelet that define shear mixing zone 24 have varying second dimensions, wherein the second dimension of the orifice 15 of each platelet defining shear mixing zone 24 is greater than the second dimension of the orifice 15 of the platelet preceding it.

Referring to FIG. 2(a), nozzle 10 may also comprise a spray distributor 64 positioned at downstream end 10 and in fluid communication with fluid outlet 14b to produce a generally flat and fan-shaped spray of the atomized liquid. Distributor 64 may be welded, bolted, brazed or otherwise attached to nozzle 10 and form a part thereof. As shown, distributor 64 comprises a flange 63 to allow distributor to effectively attach to nozzle 10. Distributor 64 has a passageway 70 (with an inlet 70a) passing therethrough configured to be substantially the same size and/or shape as orifice 30, although the cross-sectional area of passageway 70 may suitably vary to promote formation of a desired spray shape.

Passageway 70 opens up downstream into a generally flat and divergent fan-shaped spray distribution tip 71, defined by opposing wall pairs 66-66' and 74-74', which define a fan-shaped atomization zone 68. As shown in FIG. 2(a), atomization zone 68 has a first dimension that may converge, or decrease, vertically (along the y-axis) when progressing toward orifice 72 so that the first dimension is greater at the inlet than at the outlet to control the rate of shear mixing. In some embodiments, however, the first dimension of zone 68 may remain constant. Atomization zone 68 has a second dimension that diverges, or increases, (along the z-axis) when progressing toward orifice 72 so that the second dimension is greater at the outlet than at the inlet. Tip 71 terminates at orifice 72. Orifice 72 may be oriented normal to the outward flow spray direction and has its longest dimension along the z-axis, preferably having rounded or full-radiused ends (walls 74, 74'). Walls 74, 74' generally have the same curvature, but in some embodiments, the curvatures may be independently selected. Preferably, the curvature is circular. The preferred radius of curvature is about one-half the dimension of passageway 70 in the y-axis. While not required, the center of each wall's 74, 74' radius of curvature is generally located near the centerpoint of the y-axis (centerpoint of first dimension). In embodiments where first dimension varies along the x-axis, the radius of curvature may also vary.

In alternate embodiments not shown, the converging and/or diverging dimensions may be along different axes, but preferably, along axes having a 90° separation. The first and second dimensions of passageway 70, or zone 68, are preferably measured at the widest point of separation between opposing walls, i.e. at the widest point of curvature from the center or longitudinal axis or passageway 70.

In one embodiment, the width of inlet 70a along the z-axis is at least about 1.5 times the length of distributor (measured along the x-axis), and the width at exit orifice 72 is at least about 1.5 times the width of inlet 70a.

Fluid exiting orifice 30 enters atomization zone 68 and passageway 70 to further shear the fluid and further reduce the liquid droplet size. Expansion zone 68 is at a lower pressure than orifice 30, resulting in a rapidly expanding gas phase that atomizes the liquid to produce a spray of liquid droplets. This further shears the liquid droplets, and the fan shape of the atomizing tip 71 produces a fan-shaped spray of the liquid droplets that flow into the reaction zone of the FCC riser reactor as shown in FIG. 7.

FIG. 3 illustrates another embodiment of nozzle 10 that is operated and configured in a manner as previously described for other embodiments. Viewing FIG. 3(c), exit orifice 30 has arced lateral ends 130, 130' (preferably full-radiused) and has a dimension along the z-axis longer than the dimension along the y-axis, similar to that shown in FIG. 2(b) and described earlier. Arced ends 130, 130' are preferably full-radiused to correspond to the full-radiused ends of distributor 64. As is shown in FIGS. 3(b) and 3(d), shear mixing zone 24 is defined by two pairs of radially opposite and opposing walls 126, 126' and 130, 130'. Walls 126, 126' converge inward in the downstream flow direction, and walls 130, 130' diverge outward in the downstream flow direction. The net effect is either a generally overall constant cross-section of shear mixing zone 24, or one that decreases or converges and then diverges or increases by about 10%–50% larger than the minimum cross-sectional area in shear mixing zone 24.

In other words, shear mixing zone 24 has a first dimension along the y-axis that decreases progressing toward outlet 30 and preferably a second dimension along the z-axis that increases progressing toward outlet 30.

This design of diverging and converging walls produce a shear mixing zone 24 having a lower fluid pressure drop across it than the embodiment illustrated in FIG. 1. It also reduces the possibility of coalescence in shear mixing zone 24 when compared to the embodiment shown in FIG. 1.

Figure 3C:
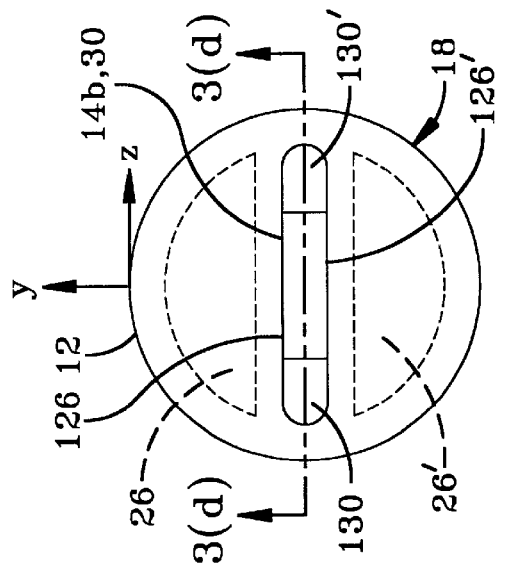
FIG. 3(c) illustrates an axially upstream view of the embodiment shown in FIG. 3(a) looking into the fluid outlet of the nozzle.
Figure 3B:
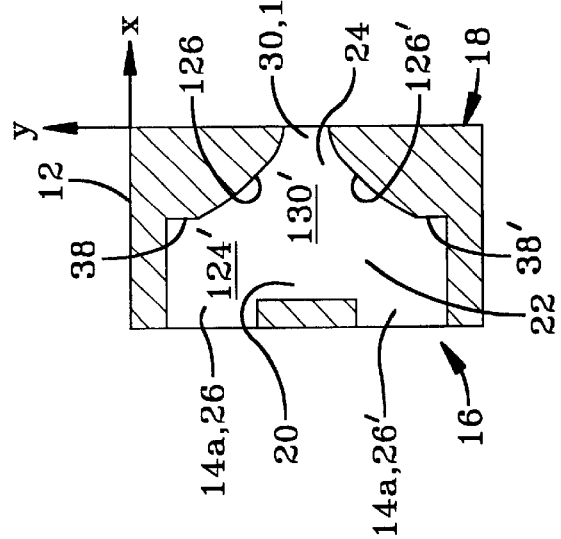
FIG. 3(b) illustrates a cross-sectional side view of the embodiment shown in FIG. 3(a) taken along the 3(b)—3(b) axis.
Figure 3A:
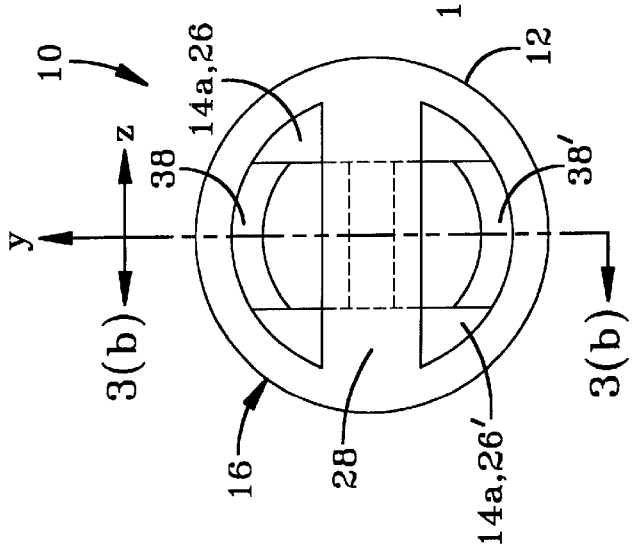
FIG. 3(a) illustrates an axially downstream view of another embodiment of a nozzle viewed looking into the fluid inlet of the nozzle.

The entrance to shear mixing zone 24 is defined by the radially inward edge of steps 38, 38' and the intersection of walls 124-130 and 124'-130'. The cross-sectional area at the entrance to shear mixing zone 24 is smaller than that of the combined cross-sectional areas of openings 26, 26' to increase the velocity of the fluid as it flows into shear mixing zone 24. In this embodiment, the divergence and convergence of shear mixing zone 24 shapes the fluid flow into a generally rectangular shape that may have arced ends as shown in FIG. 3(c). This shape promotes smooth transition of flow fluid from nozzle 10 to distributor 64.

FIGS. 4(a)–4(c) illustrate the embodiment shown in FIGS. 3(a)–3(d) with the addition of a spray distributor 64 attached to nozzle 10 in a conventional manner as previously discussed. Spray distributor 64, as shown in FIG. 9, comprises a generally fan-shaped body 152 containing a fan-shaped fluid passageway 154 within, defined by opposing and outwardly diverging walls 155, 155' that serve to control the expansion of the atomizing fluid into a fan-shaped spray. Walls 155, 155' comprise the rounded, full-radiused lateral ends of passageway 154 that preferably diverge along at least axis of passageway 154 to provide a fan-shaped spray. The embodiments shown in FIGS. 3(a)–3(d) and 4(a)–4(c) comprise arced walls 126, 126' as shown. The fluid entrance 158 to spray distributor 64 corresponds in shape to orifice 30 in nozzle 10, and the fluid outlet 160 of distributor 64 is larger to permit the atomized spray of liquid drops to continue expanding into a fan-shaped spray. The pressure in passageway 154 is lower than that in the nozzle fluid passageway 14. The mixed fluid exiting nozzle 10 and entering fluid passageway 154 atomizes into a fan-shaped spray of liquid droplets that flow through outlet 160 and into the FCC riser reaction as shown in FIG. 7. FIG. 5 illustrates a cut-away view of an atomizing nozzle 10 and distributor 64, in association with an upstream fluid conduit 164. Conduit 164 provides the flow path for a two-phase fluid to enter nozzle 10 through fluid inlet 14a (openings 26, 26').

Figure 6A:
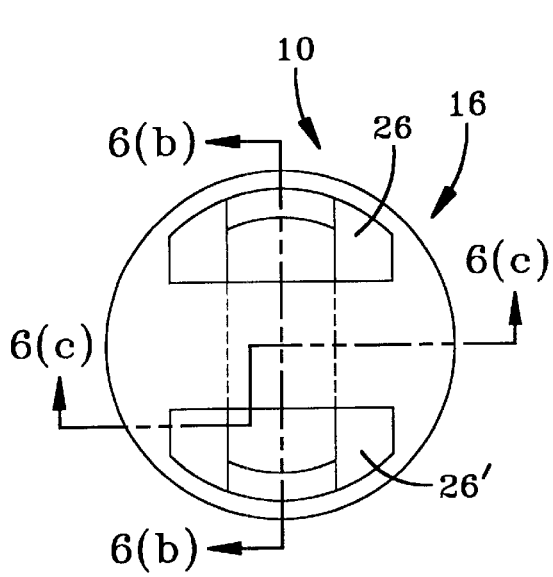
FIG. 6(a) illustrates an axially downstream view of another embodiment of a nozzle viewed looking into the fluid inlet of the nozzle.
Figure 6B:
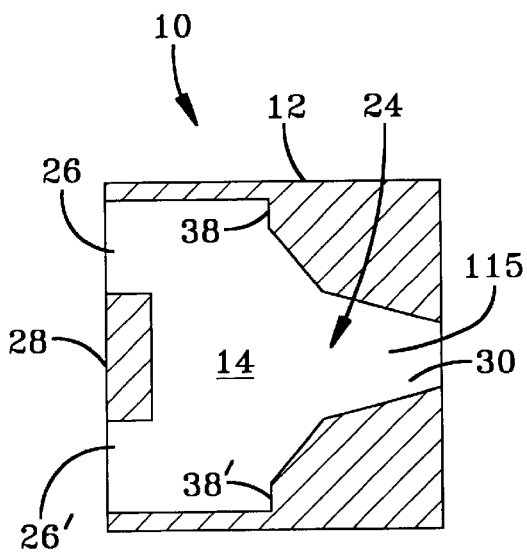
FIG. 6(b) illustrates a cross-sectional side view of the embodiment shown in FIG. 6(a) taken along the 6(b)—6(b) axis shown in FIG. 6(a).
Figure 6C:
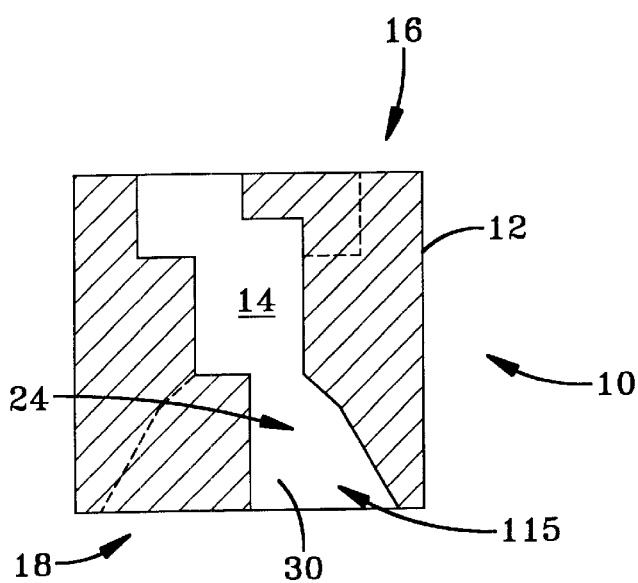
FIG. 6(c) illustrates a cross-sectional side view of the embodiment shown in FIG. 6(a) taken along the 6(c)—6(c) axis shown in FIG. 6(a).

FIGS. 6(a)–6(c) illustrate another embodiment of atomizing nozzle 10 wherein an atomization zone 115 is configured to be part of shear mixing zone 24. In all other respects, the nozzle 10 shown in FIGS. 6(a)–6(c) operates similarly to the embodiments already described. As shown in FIG. 6(a), fluid openings 26, 26' need not be completely arced segments if the pressure drop across splitter 28 is not too great.

Viewing FIG. 6(b), shear mixing zone 24 has a complexly shaped flow area where its cross-sectional area first decreases and then increases as it progresses toward orifice 30. Two partial cross-section views of the nozzle taken at 6(b)–6(b) and 6(c)–6(c) are shown in FIG. 6(b) and FIG. 6(c), to illustrate the somewhat complex nature of the shear mixing zone 24. Atomization zone 115 comprises the region or zone of smallest cross-sectional area within shear mixing zone 24. Zone 115 is preferably positioned adjacent to or near orifice 30. Atomization zone 115 may also terminate in orifice 30. Orifice 30 preferably has the same size and shape as that described and shown in previous embodiments.

As shown, a first dimension of shear mixing zone 24 decreases toward fluid outlet 14b at a first rate for at least a portion of shear mixing zone 24 and then decreases toward fluid outlet 14b at a second rate for the remainder of shear mixing zone 24. Preferably, a second dimension of shear mixing zone 24 increases toward fluid outlet 14b at a first rate for at least a portion of the shear mixing zone 24 and increases toward fluid outlet 14b at a second rate for the remainder of shear mixing zone 24.

In operation, as the two-phase fluid flows through passageway 14 into lower pressure atomization zone 115, atomization is promoted by the rapid gas expansion in the lower pressure region of atomization zone 115 and by the rapid acceleration of the lighter compressible gas than the higher density (and incompressible) liquid phase. This induces shear between the phases until their velocities more nearly equalize. The shear forces decrease the ultimate size of the liquid droplets in the atomized spray.

Nozzle 10 can be fabricated in a number of different ways. A lost wax or investment casting process may be employed, or a forging and other casting process may be used. Nozzle 10 may be fabricated from suitable ceramic or metal material or combinations thereof. As shown in FIGS. 2(a)–2(d), fabrication of nozzle 10 using a plurality of stacked, relatively thin metal plates or platelets to form a body 12 having a fluid passageway 14 therethrough is known and disclosed as useful for rocket motors and plasma torches in, for example, U.S. Pat. Nos. 3,881,701 and 5,455,401. This fabrication technique is also useful in fabricating nozzles 10 of the present invention, including the embodiments generally disclosed and shown in FIGS. 1–6, and nozzles of the invention have been fabricated using this technique. However, the invention is not intended to be limited to the use of this technique for nozzle fabrication.

Figure 8:
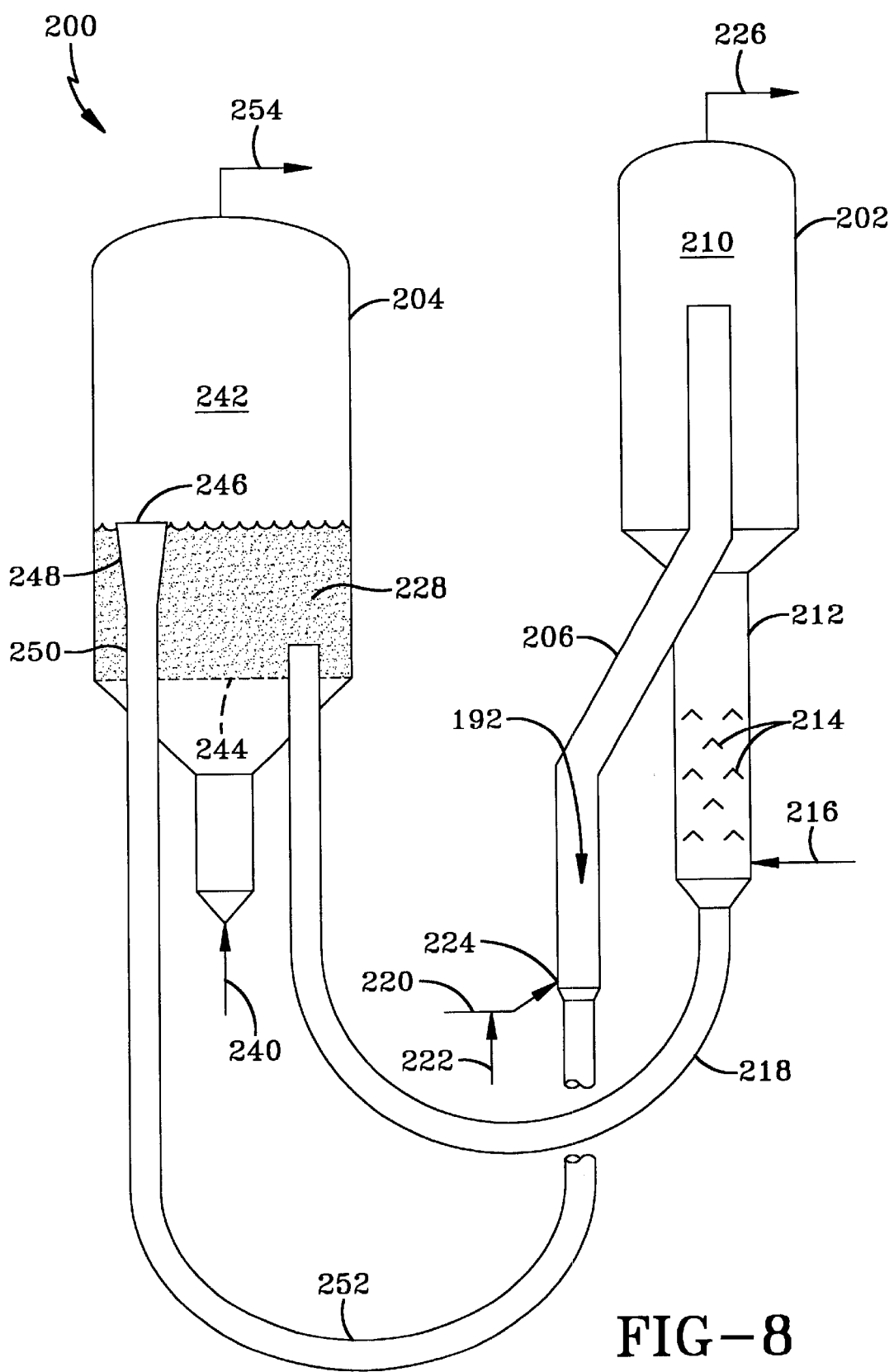
FIG. 8 illustrates a FCC process into which an embodiment of the nozzle or the process may be incorporated.

Referring now to FIG. 7, a FCC feed injection unit 180 that incorporates one or more the embodiments described herein is shown. Unit 180 comprises a hollow feed injector 182 attached to a feed nozzle means 184 via 186, 188. Feed nozzle means 184 is shown as a conduit penetrating through the wall 190 of a FCC riser 206 and into riser reaction zone 192. Riser 206, better seen in FIG. 8, is preferably a cylindrical, hollow, and substantially vertically-oriented conduit. In reaction zone 192, at least a portion of the atomized oil feed 300 contacts uprising, hot catalyst particles, and feed 300 is cracked into more useful, lower boiling hydrocarbon products. Only a portion of riser 206 is shown for convenience.

Feed injector 182 comprises a hollow conduit 194 into which preheated oil feed 300 is introduced via feed line 196. Feed line 196 forms a T-junction with the wall of the upstream portion of feed injector 182. The downstream portion of feed injector 182 comprises nozzle 10 and preferably spray distributor 64, both of which are shown as boxes for convenience. Spray distributor 64 produces a relatively flat, fan-shaped spray of the atomized oil feed 300 into reaction zone 192.

A steam sparging conduit 198, having a smaller diameter or cross-sectional area than the injector conduit 194, extends into, and is co-axially aligned with, the longitudinal axis of conduit 194. In this embodiment, the central longitudinal axes of conduits 194, 198 are coincident. This provides an annular flow path 197 for hot oil feed 300 upstream of the exit end of the injector. Steam conduit 198 terminates inside injector conduit 194, upstream of nozzle 10. A plurality of holes or orifices 199 are radially drilled circumferentially around the downstream end portion of conduit 198. Holes 198 allow steam to sparge radially outward and into the annular flow path 197 to mix with the hot oil feed 300 flowing through path 197 to produce a two-phase fluid comprising globules of hot oil dispersed in steam. The amount of steam sparged into oil feed 300 is typically between about 1 and about 5 wt. % of the hot oil feed 300. The resulting fluid mixture, which may typically comprise, on a volume basis, 75–85% steam and 15–25% oil feed 300 passes to nozzle 10 which splits it into two separate streams that enter nozzle 10 to mix and atomize the oil feed 300 as previously described.

The atomized spray of oil feed droplets 300 pass into reaction zone 192 and contact the upflowing stream of hot catalyst particles (not shown) to catalytically crack the heavy oil feed 300 into the desired lower boiling product fractions.

FIG. 8 illustrates a conventional FCC process that may incorporate one or more embodiments of the present invention. FCC unit 200 comprises a FCC reactor 202 and a regenerator 204. Reactor 202 comprises feed riser 206 containing reaction zone 192. Reactor 202 also comprises a vapor-catalyst disengaging zone 210 and a stripping zone 212 comprising a plurality of baffles 214 that look like arrays of metal "sheds" that resemble the pitched roofs of houses. A suitable stripping agent, such as steam, is introduced into the stripping zone via line 216. The stripped, spent catalyst particles pass into regenerator 204 via transfer line 218.

A preheated FCC feed passes via line 220 into the base of riser 206 at feed injection point 224. The preheated feed 300 may or may not be pre-mixed with a predetermined quantity of steam. Feed injector 182 shown in FIG. 6 is located at 224, but is not shown in FIG. 8 for simplicity. In practice, a plurality of feed injectors 182, such as those shown in FIG. 7, will be located around the circumference of riser 206. Steam may pass into feed injector 182 via line 222. The atomized droplets of hot feed 300 contact the catalyst particles in the riser. This vaporizes and catalytically cracks the feed into lighter, lower boiling fractions, including fractions in the gasoline boiling range (typically 100°–400° F., 30°–205° C.), as well as higher boiling jet fuel, diesel fuel, kerosene and the like.

The FCC catalyst may comprise any suitable conventional catalytic cracking catalyst. The catalyst may comprise a mixture of silica and alumina containing a zeolite molecular sieve cracking component, as is known to those skilled in the art.

The FCC reactions commence start when the feed 300 contacts the hot catalyst in the riser 206 and continues until the product vapors are separated from the spent catalyst in the disengaging zone 210. The cracking reaction deposits strippable hydrocarbonaceous material and non-strippable carbonaceous material known as coke, to produce spent catalyst particles which must be stripped to remove and recover the strippable hydrocarbons. The catalyst is then regenerated by burning off the coke in the regenerator.

Reactor 202 comprises cyclones (not shown) in the disengaging section 210. The cyclones separate both the cracked hydrocarbon product vapors and the stripped hydrocarbons (as vapors) from the spent catalyst particles. The hydrocarbon vapors are withdrawn via line 226. The hydrocarbon vapors are typically fed into a distillation unit or fractionator (not shown) which condenses the condensable portion of the vapors into liquids and fractionates the liquids into separate product streams.

The spent catalyst particles pass to stripping zone 212 where they contact a stripping medium, such as steam. The steam passes into stripping zone 212 via line 216 and removes the strippable hydrocarbonaceous material deposited on the catalyst during the cracking reactions. These vapors are withdrawn along with the other product vapors via line 226. The baffles 214 disperse the catalyst particles uniformly across the width of the stripping zone 212 and minimize internal refluxing or backmixing of catalyst particles in stripping zone 212. The spent, stripped catalyst particles are removed from the bottom of stripping zone 212 via transfer line 218 and pass into a fluidized bed 228 within regenerator 204.

The catalyst particles in fluidized bed 228 contact air entering the regenerator via line 240. Some of the catalyst particles pass up into disengaging zone 242. The air oxidizes or burns off the carbon deposits to regenerate the catalyst particles and heats them up to a temperature which typically ranges from about 950°–1400° F. (510°–760° C.). Regenerator 204 comprises cyclones (not shown) that separate hot regenerated catalyst particles from the gaseous combustion products, or flue gas, which comprises mostly $CO_2$, CO, $H_2O$ and $N_2$. The cyclones pass the regenerated catalyst particles back down into fluidized catalyst bed 228 via diplegs (not shown), as is known to those skilled in the art.

Fluidized bed 228 is supported on a gas distributor grid 244, which is illustrated as dashed line. The hot, regenerated catalyst particles in fluidized bed 228 overflow the weir 246 formed by the top of a funnel 248 that is connected at its bottom to the top of a downcomer 250. The bottom of downcomer 250 turns into a regenerated catalyst transfer line 252. The overflowing, regenerated particles flow down through funnel 248, downcomer 250 and into the transfer line 252 to pass back into reaction zone 192. The flue gas is removed from the top of the regenerator via line 254.

Cat cracker feeds used in FCC processes typically include gas oils, which are high boiling, non-residual oils, such as a vacuum gas oil (VGO), a straight run (atmospheric) gas oil, a light cat cracker oil (LCGO) and coker gas oils. These oils have an initial boiling point typically above about 450° F. (232° C.), and more commonly above about 650° F. (343° C.), with end points up to about 1150° F. (621° C.), as well as straight run or atmospheric gas oils and coker gas oils. In addition, one or more heavy feeds having an end boiling point above 1050° F. (566° C.) (e.g., up to 1300° F. (704° C.) or more) may be blended in with the FCC feed. Heavy feeds include, for example, whole and reduced crudes, resids or residua from atmospheric and vacuum distillation of crude oil, asphalts and asphaltenes, tar oils and cycle oils from thermal cracking of heavy petroleum oils, tar sand oil, shale oil, coal derived liquids, syncrudes and the like. These may be present in the FCC feed in an amount of from about 2 to 50 volume % of the blend, and more typically from about 5 to 30 volume %.

Heavy feeds typically contain too high a content of undesirable components, such as aromatics and compounds containing heteroatoms, particularly sulfur and nitrogen. Consequently, these feeds are often treated or upgraded to reduce the amount of undesirable compounds by processes, such as hydrotreating, solvent extraction, solid absorbents such as molecular sieves and the like, as is known.

Typical FCC reactor process conditions include a temperature of from about 800°–1200° F. (427°–648° C.), preferably 850°–1150° F. (454°–621° C.) and still more preferably 900°–1150° F. (482°–621° C.), a pressure between about 5–60 psig, preferably 5–40 psig with feed/catalyst contact times between about 0.5–15 seconds, preferably about 1–5 seconds, and with a catalyst to feed ratio of about 0.5–10 and preferably 2–8. The FCC feed is preheated to a temperature of not more than 850° F. (454° C.), preferably no greater than 800° F. (427° C.) and typically within the range of from about 500°–800° F. (260°–427° C.).

The invention will be further understood with reference to the following non-limiting example.

EXAMPLE

In this experiment, an atomizing injector similar in design to that shown in FIG. 7 with an embodiment of atomizing nozzle similar in design to that shown in FIG. 4 was compared to a commercially proven slot and fan design, similar to that shown in U.S. Pat. No. 5,173,175. The commercial nozzle simulated a pipe with an end cap containing a rectangular, slotted orifice, with an attached downstream diverging flat fan atomizing tip. Both nozzles included a fan-shaped atomizing distributor or tip and were fabricated at a scale of one half the size of a typical commercial nozzle. The injector was the same for both cases except for the nozzle design. Both injectors produced a flat, fan-shaped spray and were mounted horizontally and oriented to produce a flat, fan-shaped spray with the maximum width in the vertical direction, in the laser light beam path of a Malvern particle sizer. This instrument is well known and used for measuring liquid spray characteristics. Light diffraction patterns, each associated with a characteristic drop size range, are focused by a Fourier transform lens onto a multi-element photodetecter. The light energy distribution is converted, via a computer, into a corresponding liquid droplet size distribution.

Gaseous nitrogen was used to simulate the gas phase and liquid water was used to simulate the liquid phase.

A grid of comparative experiments was conducted varying water and nitrogen flow rates and the Sauter mean liquid drop diameter was calculated, assuming a Rosin-Rammier distribution function. The results for the two different nozzle designs are compared in the Table below.

| Injector Type | Water (mass lb/sec) | Nitrogen (scf/sec) | Sauter mean diameter (microns) |
|---|---|---|---|
| Commercial Fan | 4.93 | 0.93 | 283 |
| | 4.99 | 0.39 | 442 |
| | 4.47 | 0.62 | 313 |
| | 3.64 | 0.40 | 451 |
| | 3.53 | 0.94 | 253 |
| The Invention | 4.84 | 0.93 | 252 |
| | 4.97 | 0.40 | 342 |
| | 4.36 | 0.63 | 291 |
| | 3.46 | 0.39 | 262 |
| | 3.52 | 1.00 | 162 |

In all cases, at comparable water and nitrogen flow rates, a nozzle of the present invention produced an atomized spray having smaller Sauter mean diameter liquid droplets, than did the commercial design. This shows that better atomization was achieved with a nozzle of the present invention.

It is understood that various other embodiments and modifications in the practice of the invention will be apparent to, and can be readily made by, those skilled in the art without departing from the scope and spirit of the invention described above. Accordingly, it is not intended that the scope of the claims appended hereto be limited to the exact description set forth above, but rather that the claims be construed as encompassing all of the features of patentable novelty which reside in the present invention, including all the features and embodiments which would be treated as equivalents thereof by those skilled in the art to which the invention pertains.

What is claimed is:

1. A process for forming a spray of liquid droplets comprising the steps of:
   (a) forming two streams of a two-phase fluid comprising a gas phase and a liquid phase by passing said fluid trough two fluid entrances having a cross-sectional area;
   (b) passing said streams into an expansion zone;
   (c) passing said streams to an impingement mixing zone wherein at least a portion of each said stream is impinged against at least a portion of another said stream and wherein the included angle between the impinged streams is between about 120° and 240° to form a single mixed stream;

(d) passing said single mixed stream to a shear mixing zone and imparting shear mixing forces to said single mixed stream to form a shear mixed stream;

(e) passing said single mixed stream trough an orifice having a cross-sectional area less than the sum of the cross-sectional area of said fluid entrances;

(f) passing said shear mixed stream to an atomizing zone wherein said gas phase expands and increases the surface area of said liquid phase, thereby producing a spray of liquid droplets.

2. The process according to claim 1 wherein the included angle between the impinged streams is between about 120° and about 240°.

3. The process according to claim 1 wherein the included angle between the impinged streams is about 180°.

4. The process according to claim 1 wherein the included angle between the impinged streams is between about 175° and about 185°.

* * * * *